(12) United States Patent
Incorvia

(10) Patent No.: US 6,178,772 B1
(45) Date of Patent: Jan. 30, 2001

(54) RECEIVER AND FILTER AND ADSORBENT UNIT THEREFOR

(75) Inventor: Samuel A. Incorvia, North Tonawanda, NY (US)

(73) Assignee: Multisorb Technologies, Inc., Buffalo, NY (US)

(*) Notice: Under 35 U.S.C. 154(b), the term of this patent shall be extended for 0 days.

(21) Appl. No.: 09/258,360

(22) Filed: Feb. 26, 1999

(51) Int. Cl.⁷ .............. F25B 39/04; F25B 43/00
(52) U.S. Cl. .............. 62/509; 62/475; 62/503; 96/135
(58) Field of Search .............. 62/509, 475, 503; 210/282

(56) References Cited

U.S. PATENT DOCUMENTS

| | | | |
|---|---|---|---|
| 4,364,756 | * 12/1982 | Clarke et al. | 210/282 X |
| 4,401,447 | 8/1983 | Huber | 55/387 |
| 4,436,623 | 3/1984 | Cullen et al. | 210/282 |
| 4,756,166 | 7/1988 | Tomasov | 62/509 |
| 5,245,842 | 9/1993 | Searfoss et al. | 62/474 |
| 5,435,153 | 7/1995 | Hutchinson et al. | 62/474 |
| 5,522,204 | * 6/1996 | Wood | 210/282 X |
| 5,580,451 | * 12/1996 | Tack | 210/282 X |
| 5,596,882 | * 1/1997 | Hutchinson et al. | 62/503 X |
| 5,718,743 | 2/1998 | Donnelly et al. | 96/135 |
| 5,865,998 | * 2/1999 | Abraham et al. | 210/282 |
| 5,910,165 | * 6/1999 | Haramoto et al. | 62/474 |
| 5,914,456 | * 6/1999 | LeConey et al. | 62/503 X |

* cited by examiner

Primary Examiner—William Doerrler
Assistant Examiner—Chen-Wen Jiang
(74) Attorney, Agent, or Firm—Joseph P. Gastel

(57) ABSTRACT

An improved refrigerant receiver which includes an improved combined filter and adsorbent unit consisting of a filter extending outwardly from an elongated tube which is mounted on a refrigerant outlet conduit of the receiver and which has an outer edge with the wall of the receiver so that all refrigerant must pass through the filter, and at least one container of adsorbent material mounted within the receiver so as to be exposed to the flow of refrigerant passing through the filter without completely obstructing the portion of the receiver through which this flow passes.

35 Claims, 3 Drawing Sheets

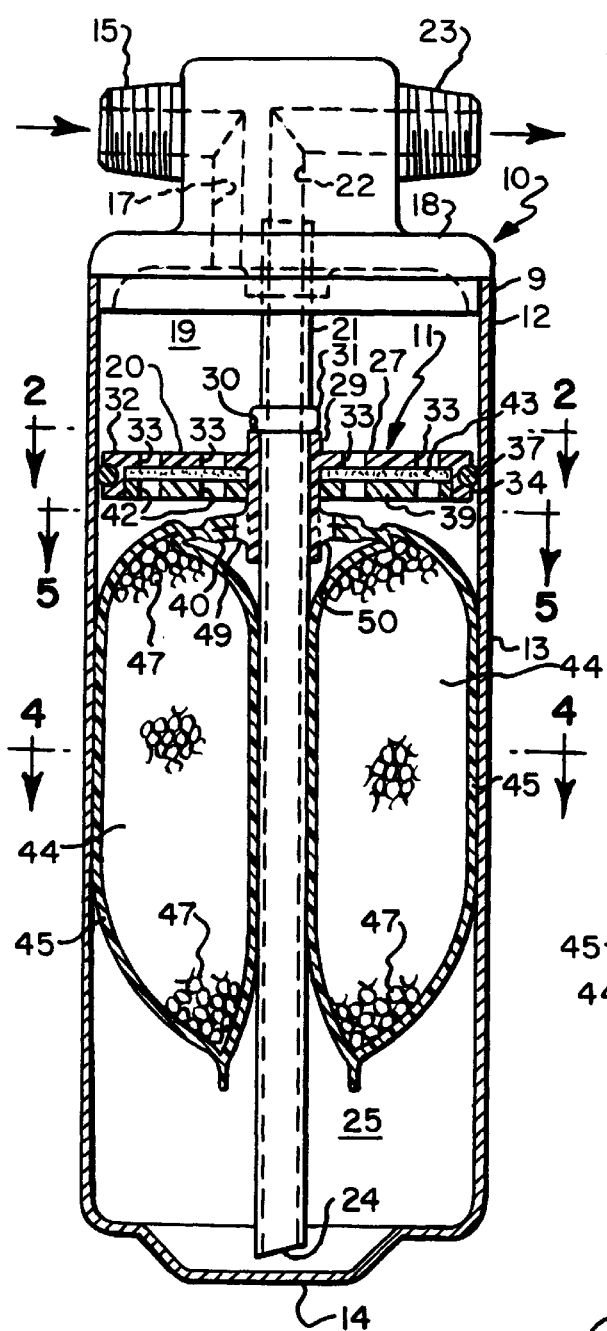
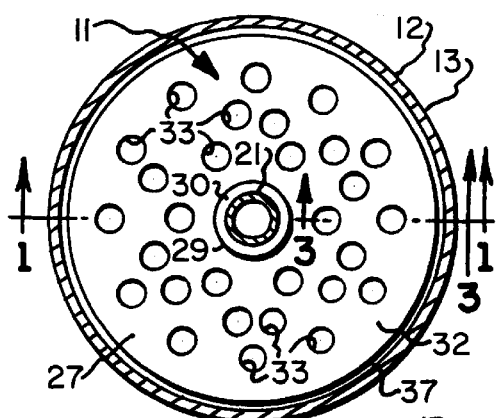
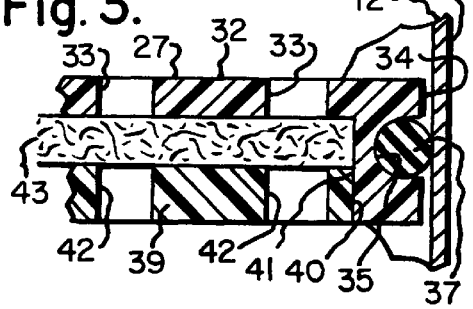
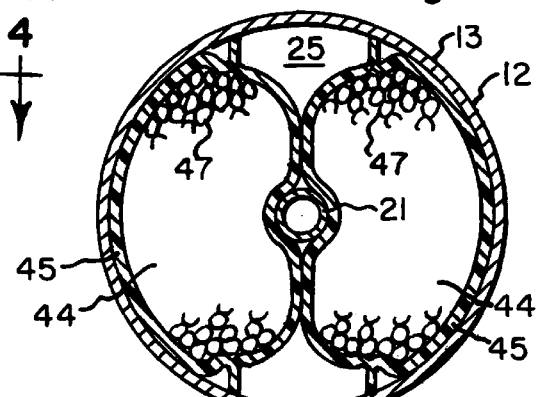
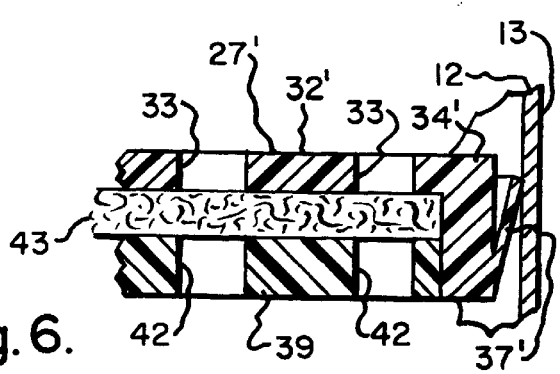

RECEIVER AND FILTER AND ADSORBENT UNIT THEREFOR

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to an improved combined filter and adsorbent unit for a refrigerant receiver and to an improved receiver containing a combination of a filter and an adsorbent unit.

By way of background, there are numerous types of filters and adsorbent units used in combination in a receiver of a refrigeration system. However, many filters are small units located over the inlet to the outlet conduit of the receiver, and thus have a relatively small area for filtration, and this small area overlies the relatively small area of the opening of the outlet conduit so that there could be restriction of refrigerant flow in this area. Additionally, there are in existence donut types of adsorbent units which occupy the entire cross sectional area of the receiver and through which all flow must pass. However, sealing of the filter has either been relatively complex or inefficient. It is with the foregoing deficiencies of the prior art that the present invention is concerned.

BRIEF SUMMARY OF THE INVENTION

It is accordingly one object of the present invention to provide an improved combined filter and adsorbent unit which can be installed in a receiver in a simple and unique manner.

Another object of the present invention is to provide an improved refrigerant receiver containing a filter and an adsorbent unit uniquely contained therein. Other objects and attendant advantages of the present invention will readily be perceived hereafter.

The present invention relates to a combined filter and adsorbent unit comprising an elongated tubular member, a filter extending transversely outwardly from said elongated tubular member, and a container of adsorbent material secured relative to said elongated tubular member.

The present invention also relates to an improved refrigerant receiver having a housing, a wall on said housing, a refrigerant inlet on said housing, a refrigerant outlet on said housing, an elongated refrigerant outlet conduit extending lengthwise of said housing in communication with said refrigerant outlet, and a refrigerant-receiving opening in said elongated refrigerant outlet conduit, the improvement comprising an elongated tube mounted about said elongated refrigerant outlet conduit, a filter extending transversely outwardly from said elongated tube and positioned between said refrigerant inlet and said refrigerant-receiving opening in said elongated refrigerant outlet conduit, an outer edge on said filter in contiguous relationship with said wall, and at least one container of adsorbent material in said housing.

The present invention will be more fully understood when the following portions of the specification are read in conjunction with the accompanying drawings wherein:

BRIEF DESCRIPTION OF THE SEVERAL VIEWS OF THE DRAWING

FIG. 1 is a cross sectional view of a refrigerant receiver of a refrigerant system taken substantially along line 1—1 of FIG. 2;

FIG. 2 is a cross sectional view taken substantially along line 2—2 of FIG. 1;

FIG. 3 is an enlarged fragmentary cross sectional view taken substantially along line 3—3 of FIG. 2 and showing an O-ring seal between the filter and the wall of the receiver housing;

FIG. 4 is a cross sectional view taken substantially along line 4—4 of FIG. 1;

FIG. 6 is an enlarged fragmentary cross sectional view similar to FIG. 3 but showing another form of filter;

DETAILED DESCRIPTION OF THE INVENTION

Figure 5:
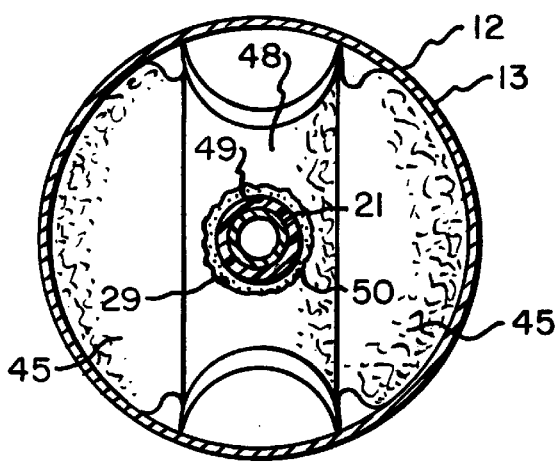
FIG. 5 is a cross sectional view taken substantially along line 5—5 of FIG. 1 and showing the yoke connection between the two adsorbent containers.

Summarizing briefly in advance, the present invention relates to an improved combined filter and adsorbent unit for use in a receiver and to an improved receiver which includes a filter and adsorbent unit uniquely associated therewith.

The refrigerant receiver portion 9 of the combined refrigerant receiver-filter-adsorbent unit 10 includes a housing 12 having a cylindrical wall 13 and a bottom 14. A cap or cover 18 is located at the top of cylindrical wall 13 and is suitably sealed thereto. An inlet fitting 15 is in communication with conduit 17 in cover 18 which leads to chamber 19 located above filter 20. A refrigerant outlet conduit 21 has its upper end suitably affixed in fluid-tight relationship with cover 18, and it is in communication with conduit 22 within cover 18 which leads to receiver outlet fitting 23. Refrigerant outlet conduit 21 has an opening 24 at the bottom thereof which is in communication with chamber 25 which is below filter 20. The refrigerant flow through receiver 10 is from inlet fitting 15, through conduit 17, through chambers 19 and 25, into opening 24 at the bottom of refrigerant outlet conduit 21, through refrigerant outlet conduit 21, through conduit 22 in cover 18 and out of refrigerant outlet fitting 23. All of the foregoing parts exclusive of the combined filter and adsorbent unit 10 are known and the above-described refrigerant flow path is conventional in the art.

In accordance with one embodiment of the present invention, there are provided a filter and an adsorbent unit in the refrigerant flow path through the receiver for the purpose of both filtering the refrigerant and adsorbing moisture therefrom thus resulting in an improved receiver by virtue of having a filter and an adsorbent unit combined therewith in a unique manner.

A preferred embodiment of the present invention comprises a combined filter and adsorbent unit 11 wherein a filter 27 extends outwardly from elongated tube 29 which is mounted on refrigerant outlet conduit 21 with an interference fit, with the upper annular edge 30 of elongated tube 29 bearing against expanded annular portion 31 of conduit 21. The filter 27 includes an upper disc 32 having perforations 33 therein. The outer edge 34 of disc 32 is in the form of a depending rim having an annular groove 35 therein. An O-ring 37 is located in annular groove 35 and provides a seal between edge 34 and wall 13 of housing 12. A second circular disc 39 has an outer edge 40 which is pressed into the inner edge 41 of rim 34, and disc 39 has a plurality of perforations 42 therein. Disc 39 may have the same number of perforations therein as does upper disc 27. Upper disc 27 has its inner edge fused to elongated tube 29, but it may be separate therefrom and mounted thereon by a press-fit. The apertures 33 of upper disc 27 and the apertures 42 of lower disc 39 need not necessarily be aligned as shown in FIGS. 1 and 3. Positioned between upper disc 27 and lower disc 39 is filtering material 43. This material is preferably polyester, but it may be any suitable filtering material which will permit the refrigerant to pass therethrough without an objectionable pressure drop while filtering impurities from the refrigerant. As can be seen from the drawings, the discs 27 and 39 are fabricated out of molded plastic. Considering the manner in which filter 27 is positioned within cylindrical wall 13, all of the refrigerant in upper chamber 19 must pass through filter 27 in passing from upper chamber 19 to lower chamber 25. Furthermore, considering that tube 29 is elongated, it will maintain filter 27 against cocking within housing wall 13.

Further in accordance with the concept of the present invention, a pair of adsorbent containers 44 are located in chamber 25 below filter 27. Adsorbent containers 44 are of the type which are well known in the art such as shown in U.S. Pat. No. 4,401,447, which is incorporated herein by reference. Basically, each adsorbent container 44 includes a casing 45 of permeable material within which is a drying agent such as molecular sieve or silica gel or any other type of adsorbent such as described in the above-identified prior art U.S. Pat. No. 4,401,447. A yoke 48 connects adsorbent containers 44, and yoke 48 has a central aperture 49 therein which receives elongated tube 29, and rim 50 is fused to elongated tube 29. Thus, two adsorbent containers 44 are suspended from elongated tube 29 well above conduit inlet 24. As can be seen from FIG. 4, adsorbent containers 44 do not occupy the entire cross section of the cylindrical housing 12 and thus the refrigerant passing through chamber 25 may pass around adsorbent containers 44 enroute to conduit opening 24.

The combined filter and adsorbent unit 11 is thus a unique entity which can be mounted in a conventional receiver of the above-described type to thereby convert it to the improved receiver.

In FIG. 6 a modified form of filter 27' is shown. In this modification the upper disc 32' has a rim 34' which has a flexible annular lip 37' which provides a seal between rim 34' and cylindrical wall 13. Except for the configuration of annular rim 34' and lip 37', all parts of filter 27' may be identical to filter 27 described in detail above.

Figure 7:
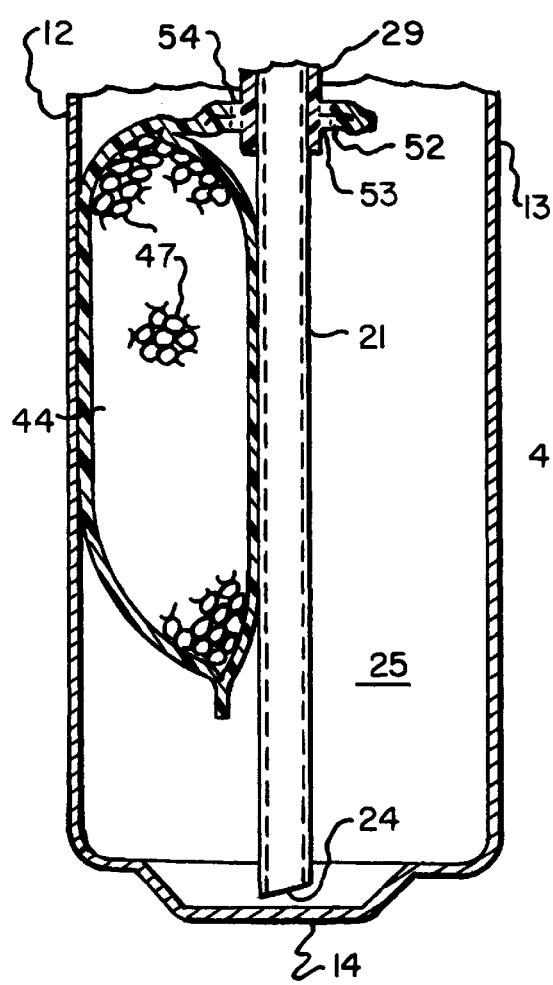
FIG. 7 is a fragmentary view of a portion of FIG. 1 and showing another embodiment wherein only one adsorbent container is secured to the elongated tube mounted on the elongated outlet conduit of the receiver.

In FIG. 7 a modified embodiment of the present invention is disclosed. All parts of FIG. 7 may be identical to those described above relative to FIGS. 1–6, except that only a single adsorbent container 44 is disclosed rather than two adsorbent containers 44 coupled together by a yoke 47. In the embodiment of FIG. 7 the adsorbent container 44 is secured to elongated tube 29 by a tab 52 having a central aperture 53, the rim 54 of which is fused to elongated tube 29.

Figure 8:
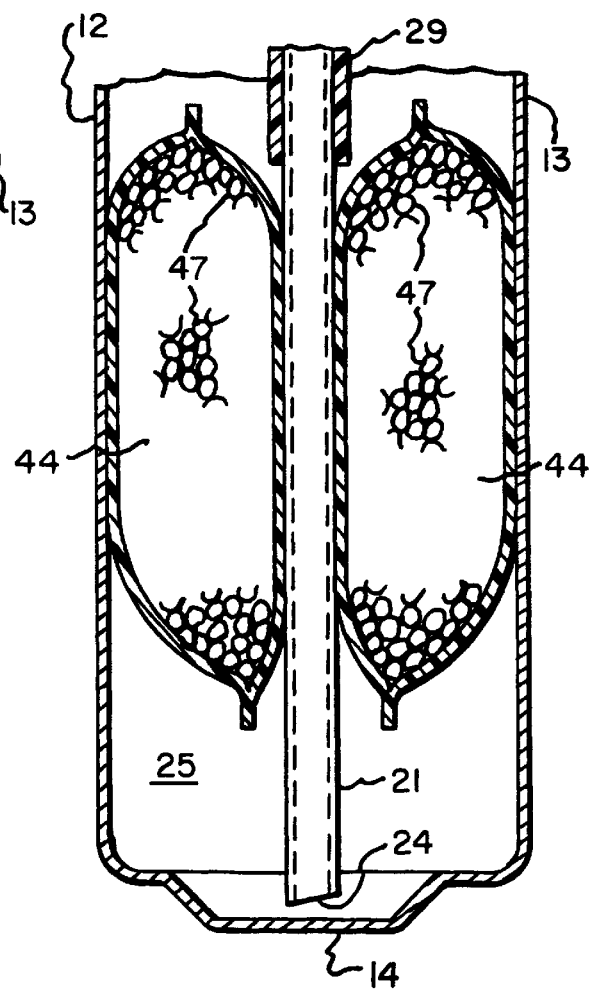
FIG. 8 is a fragmentary cross sectional view of a portion of FIG. 1 showing still another embodiment wherein a pair of adsorbent containers are mounted loosely in the refrigerant receiver.

In FIG. 8 a still further embodiment of the present invention is disclosed wherein adsorbent containers 44 are not secured to elongated tube 29 but are merely located within chamber 25. While two adsorbent containers 44 are shown in FIG. 8, it will be appreciated that, depending on the amount of desiccant which is required, only a single adsorbent container may be used.

Figure 9:
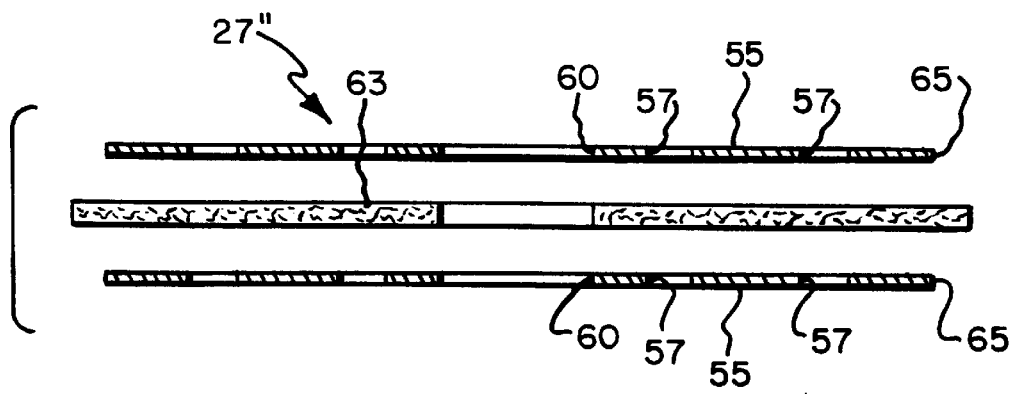
FIG. 9 is an exploded view of another embodiment of a filter.
Figure 10:
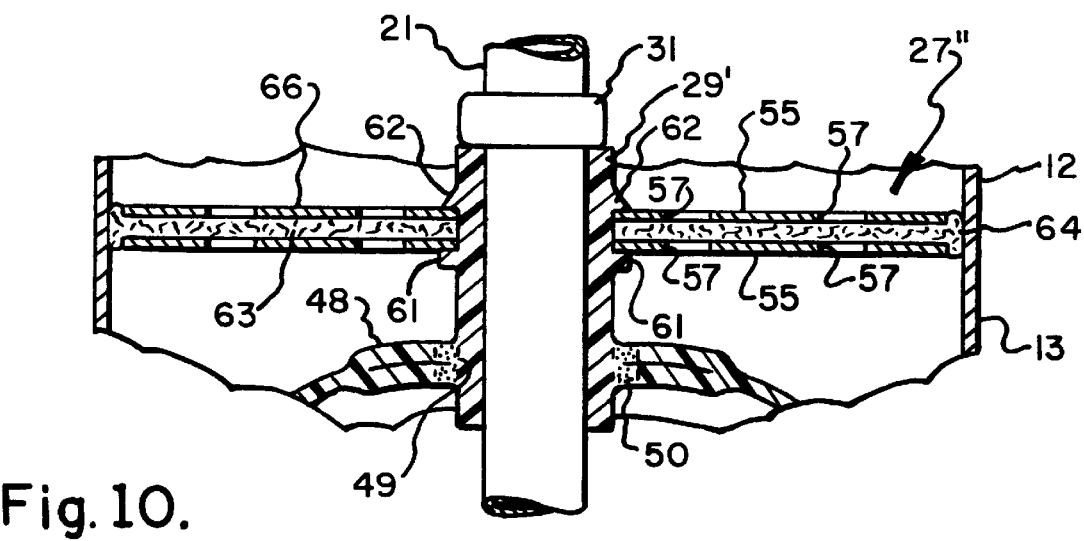
FIG. 10 is a fragmentary cross sectional view showing the assembled filter components of FIG. 9 staked to an elongated tube and mounted within a refrigerant receiver of the type shown in FIG. 1.

In FIGS. 9 and 10 another filter embodiment 27" is disclosed. In this embodiment two metal perforated discs 55 are shown having perforations 57 therein which may be as shown in FIG. 2. The inner edges 60 of discs 55 are mounted on elongated tube 29' which is analogous to elongated tube 29 of FIG. 1, and elongated tube 29' is mounted on refrigerant outlet conduit 21 as described above relative to FIG. 1. The discs 55 are maintained in position on elongated tube 29' by being located between an annular rim 61 and staked portions 62. A layer of filter material 63 is compressed between discs 55 and the outer annular edge 64 of the filter material extends beyond the outer edges 65 of discs 55 and serves as a seal between the filter 27" and cylindrical wall 13 of housing 12. It will be appreciated that the filter embodiment 27" may be substituted for any of the filters shown in the preceding figures, and further that filter 27" may be used with any embodiment of the adsorbent containers described above in FIGS. 1, 7 and 8.

In the above embodiments the filter material was sandwiched between molded plastic discs and metal plates. However, the filter can be fused to a grid-like plate such as shown in U.S. Pat. No. 5,718,743, or it can be contained in any suitable manner.

While preferred embodiments of the present invention have been disclosed, it will be appreciated that it is not limited thereto, but may be otherwise embodied within the scope of the following claims.

What is claimed is:

1. A combined filter and adsorbent unit comprising an elongated tubular member, a filter extending transversely outwardly from said elongated tubular member, and a complete container of adsorbent material which is not part of said elongated tubular member secured relative to said elongated tubular member.

2. A combined filter and adsorbent unit as set forth in claim 1 including a second complete container of adsorbent material which is not part of said elongated tubular member secured relative to said elongated tubular member.

3. A combined filter and adsorbent unit as set forth in claim 2 wherein said container of adsorbent material and said second container of adsorbent material are secured to each other by a yoke.

4. A combined filter and adsorbent unit comprising an elongated tubular member, a filter extending transversely outwardly from said elongated tubular member, and a container of adsorbent material secured relative to said elongated tubular member, said filter comprising first and second spaced perforated discs with filter material therebetween.

5. A combined filter and adsorbent unit as set forth in claim 4 including a second container of adsorbent material secured relative to said elongated tubular member.

6. A combined filter and adsorbent unit as set forth in claim 5 wherein said container of adsorbent material and said second container of adsorbent material are secured to each other by a yoke.

7. A combined filter and adsorbent unit as set forth in claim 4 wherein said filter material extends outwardly beyond the edges of said perforated discs.

8. A combined filter and adsorbent unit as set forth in claim 7 including a second container of adsorbent material secured relative to said elongated tubular member.

9. A combined filter and adsorbent unit as set forth in claim 8 wherein said container of adsorbent material and said second container of adsorbent material are secured to each other by a yoke.

10. A combined filter and adsorbent unit as set forth in claim 4 including a first outer edge portion on said first perforated disc, an internal surface on said first outer edge portion, and a second outer edge portion on said second perforated disc positioned in contiguous relationship to said internal surface.

11. A combined filter and adsorbent unit as set forth in claim 10 including an external surface on said first outer edge portion, and a seal member on said external surface.

12. A combined filter and adsorbent unit as set forth in claim 11 wherein said seal is an O-ring.

13. A combined filter and adsorbent unit as set forth in claim 11 wherein said seal is an annular flap extending outwardly from said external surface.

14. A combined filter and adsorbent unit as set forth in claim 11 including a second container of adsorbent material secured relative to said elongated tubular member.

15. A combined filter and adsorbent unit as set forth in claim 14 wherein said container of adsorbent material and said second container of adsorbent material are secured to each other by a yoke.

16. In a refrigerant receiver having a housing, a wall on said housing, a refrigerant inlet on said housing, a refrigerant outlet on said housing, an elongated refrigerant outlet conduit extending lengthwise of said housing in communication with said refrigerant outlet, and a refrigerant-receiving opening in said elongated refrigerant outlet conduit, the improvement comprising an elongated tube mounted about said elongated refrigerant outlet conduit, a filter extending transversely outwardly from said elongated tube and positioned between said refrigerant inlet and said refrigerant-receiving opening in said elongated refrigerant outlet conduit, an outer edge on said filter in contiguous relationship with said wall, and at least one complete container of adsorbent material in said housing which is not part of said elongated tubular member.

17. In a refrigerant receiver as set forth in claim 16 wherein said container of adsorbent material is located between said filter and said refrigerant-receiving opening in said refrigerant outlet conduit.

18. In a refrigerant receiver as set forth in claim 17 wherein said container of adsorbent material is secured relative to said elongated tube.

19. In a refrigerant receiver as set forth in claim 16 including a second container of adsorbent material in said housing.

20. In a refrigerant receiver as set forth in claim 19 wherein said container of adsorbent material and said second container of adsorbent material are located between said filter and said refrigerant-receiving opening.

21. In a refrigerant receiver as set forth in claim 20 wherein at least one of said containers of adsorbent material is secured relative to said elongated tube.

22. In a refrigerant receiver as set forth in claim 20 wherein said container of adsorbent material and said second container of adsorbent material are both secured relative to said elongated tube.

23. In a refrigerant receiver having a housing, a wall on said housing, a refrigerant inlet on said housing, a refrigerant outlet on said housing, an elongated refrigerant outlet conduit extending lengthwise of said housing in communication with said refrigerant outlet, and a refrigerant-receiving opening in said elongated refrigerant outlet conduit, the improvement comprising an elongated tube mounted about said elongated refrigerant outlet conduit, a filter extending transversely outwardly from said elongated tube and positioned between said refrigerant inlet and said refrigerant-receiving opening in said elongated refrigerant outlet conduit, an outer edge on said filter in contiguous relationship with said wall, at least one container of adsorbent material in said housing, a second container of adsorbent material in said housing, said container of adsorbent material and said second container of adsorbent material being located between said filter and said refrigerant-receiving opening, said container of adsorbent material and said second container of adsorbent material both being secured relative to said elongated tube, and said filter comprising spaced perforated discs with filter material therebetween.

24. In a refrigerant receiver having a housing, a wall on said housing, a refrigerant inlet on said housing, a refrigerant outlet on said housing, an elongated refrigerant outlet conduit extending lengthwise of said housing in communication with said refrigerant outlet, and a refrigerant-receiving opening in said elongated refrigerant outlet conduit, the improvement comprising an elongated tube mounted about said elongated refrigerant outlet conduit, a filter extending transversely outwardly from said elongated tube and positioned between said refrigerant inlet and said refrigerant-receiving opening in said elongated refrigerant outlet conduit, an outer edge on said filter in contiguous relationship with said wall, at least one container of adsorbent material in said housing, and said filter comprising spaced perforated discs with filter material therebetween.

25. In a refrigerant receiver as set forth in claim 24 wherein said container of adsorbent material is located between said filter and said refrigerant-receiving opening in said refrigerant outlet conduit.

26. In a refrigerant receiver as set forth in claim 25 wherein said filter material extends outwardly beyond the edges of said perforated discs and is in sealing engagement with said wall.

27. In a refrigerant receiver having a housing, a wall on said housing, a refrigerant inlet on said housing, a refrigerant outlet on said housing, an elongated refrigerant outlet conduit extending lengthwise of said housing in communication with said refrigerant outlet, and a refrigerant-receiving opening in said elongated refrigerant outlet conduit, the improvement comprising an elongated tube mounted about said elongated refrigerant outlet conduit, a filter extending transversely outwardly from said elongated tube and positioned between said refrigerant inlet and said refrigerant-receiving opening in said elongated refrigerant outlet conduit, an outer edge on said filter in contiguous relationship with said wall, at least one container of adsorbent material in said housing, and a seal between said outer edge of said filter and said wall.

28. In a refrigerant receiver as set forth in claim 27 wherein said seal is an O-ring.

29. In a refrigerant receiver as set forth in claim 27 wherein said seal is a flap extending outwardly from said outer edge of said filter.

30. In a refrigerant receiver having a housing, a wall on said housing, a refrigerant inlet on said housing, a refrigerant outlet on said housing, an elongated refrigerant outlet conduit extending lengthwise of said housing in communication with said refrigerant outlet, and a refrigerant-receiving opening in said elongated refrigerant outlet conduit, the improvement comprising an elongated tube mounted about said elongated refrigerant outlet conduit, a filter extending transversely outwardly from said elongated tube and positioned between said refrigerant inlet and said refrigerant-receiving opening in said elongated refrigerant outlet conduit, an outer edge on said filter in contiguous relationship with said wall, at least one container of adsorbent material in said housing, and said filter comprising spaced perforated discs with filter material therebetween, and said filter material comprising said outer edge of said filter which is in engagement with said wall.

31. A combined filter and adsorbent unit comprising an elongated tubular member, a filter extending transversely outwardly from said elongated tubular member, an outer annular edge on said filter, a seal on said outer annular edge, and a container of adsorbent material secured relative to said elongated tubular member.

32. A combined filter and adsorbent unit as set forth in claim 31 wherein said seal is an O-ring.

33. A combined filter and adsorbent unit as set forth in claim 31 wherein said seal is a flap extending outwardly from said outer annular edge of said filter.

34. A combined filter and adsorbent unit as set forth in claim 31 including a second container of adsorbent material secured relative to said elongated tubular member.

35. A combined filter and adsorbent unit as set forth in claim 34 wherein said container and said second container are secured to each other by a yoke.

* * * * *

UNITED STATES PATENT AND TRADEMARK OFFICE
CERTIFICATE OF CORRECTION

PATENT NO. : 6,178,772 B1  Page 1 of 2
DATED : January 30, 2001
INVENTOR(S) : Samuel A. Incorvia It is certified that error appears in the above-identified patent and that said Letters Patent is hereby corrected as shown below:

Column 5,
Line 13, after "seal" insert -- member --.
Line 15, after "seal" insert -- member --.

Delete claim 16.

Change claim 17 to read:

-- In a refrigerant receiver having a housing, a wall on said
housing, a refrigerant inlet on said housing, a refrigerant outletoOn said housing, an elongated refrigerant outlet conduit extending
lengthwise of said housing in communication with said refrigerant
outlet, and a refrigerant-receiving opening in said elongated
refrigerant outlet conduit, the improvement comprising an enlongated
tube mounted about said elongated refrigerant outlet conduit, a
filter extending transversely outwardly from said elongated tube and
positioned between said refrigerant inlet and said refrigerant-
receiving opening in said elongated refrigerant outlet conduit, an
outer edge on said filter in contiguous relationship with said wall,
and at least one complete container of adsorbent material in said
housing which is not part of said elongated tube, said container of
adsorbent material being loacted between said filter and said
refrigerant-receiving opening in said refrigerant outlet conduit. --

UNITED STATES PATENT AND TRADEMARK OFFICE
CERTIFICATE OF CORRECTION

PATENT NO. : 6,178,772 B1
DATED : January 30, 2001
INVENTOR(S) : Samuel A. Incorvia It is certified that error appears in the above-identified patent and that said Letters Patent is hereby corrected as shown below:

Column 5,
Line 46, change "16" to -- 17 --.
Line 50, delete "said container of adsorbent material and";
Line 51, before "located" delete "are" and insert -- is also --.

Column 6,
Line 49, before "container" insert -- complete --
Line 49, after "housing" insert -- which is
not part of said elongated tube, said container of
adsorbent material being located between
said filter and said refrigerant-receiving opening in said
refrigerant outlet conduit --.

Signed and Sealed this

Twentieth Day of November, 2001

Attest:

*Nicholas P. Godici*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,178,772 B1
DATED : January 30, 2001
INVENTOR(S) : Samuel A. Incorvia It is certified that error appears in the above-identified patent and that said Letters Patent is hereby corrected as shown below:

Column 5,
Line 13, after "seal" insert -- member --.
Line 15, after "seal" insert -- member --.

Claims,
Delete claim 16.
Change claim 17 to read:
-- In a refrigerant receiver having a housing, a wall on said housing, a refrigerant inlet on said housing, a refrigerant outlet on said housing, an elongated refrigerant outlet conduit extending lengthwise of said housing in communication with said refrigerant outlet, and a refrigerant-receiving opening in said elongated refrigerant outlet conduit, the improvement comprising an elongated tube mounted about said elongated refrigerant outlet conduit, a filter extending transversely outwardly from said elongated tube and positioned between said refrigerant inlet and said refrigerant-receiving opening in said elongated refrigerant outlet conduit, an outer edge on said filter in contiguous relationship with said wall, and at least one complete container of adsorbent material in said housing which is not part of said elongated tube, said container of adsorbent material being located between said filter and said refrigerant-receiving opening in said refrigerant outlet conduit. --

Column 5,
Line 46, change "16" to -- 17 --.
Line 50, delete "said container of adsorbent material and";
Line 51, before "located" delete "are" and insert -- is also --.

UNITED STATES PATENT AND TRADEMARK OFFICE
CERTIFICATE OF CORRECTION

PATENT NO. : 6,178,772 B1
DATED : January 30, 2001
INVENTOR(S) : Samuel A. Incorvia It is certified that error appears in the above-identified patent and that said Letters Patent is hereby corrected as shown below:

Column 6,
Line 49, before "container" insert -- complete --
Line 49, after "housing" insert -- which is not part of said elongated tube, said container of adsorbent material being located between said filter and said refrigerant-receiving opening in said refrigerant outlet conduit --.

This certificate supersedes Certificate of Correction issued November 13, 2001

Signed and Sealed this

Nineteenth Day of March, 2002

Attest:

Attesting Officer

JAMES E. ROGAN
Director of the United States Patent and Trademark Office